March 31, 1925.                                                   1,531,342
                         D. MOIR ET AL
    MEANS FOR THE MANUFACTURE, CENTRIFUGALLY, OF PIPES,
           COLUMNS, AND OTHER HOLLOW ARTICLES
                     Filed Oct. 13, 1923
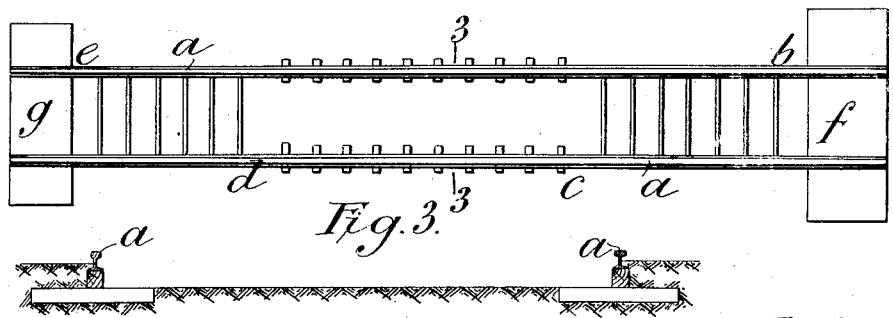
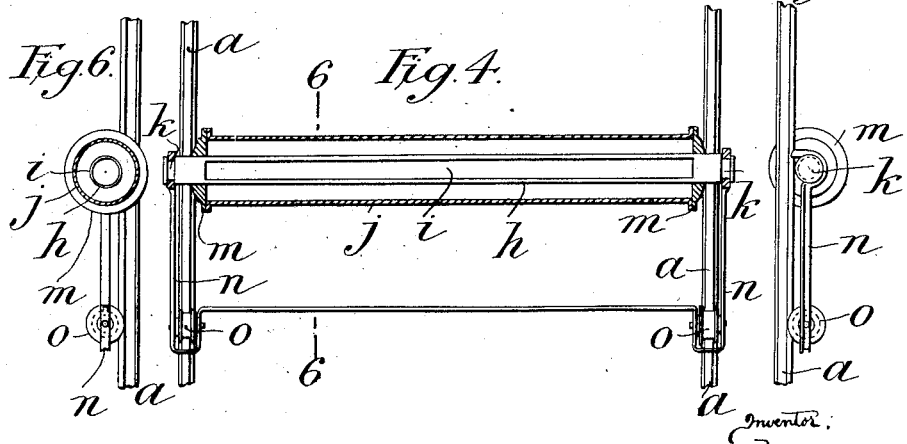
Inventor.
Donald Moir.
Hugh Buchanan
By Davis & Davis
          Attys Patented Mar. 31, 1925.

1,531,342

UNITED STATES PATENT OFFICE.

DONALD MOIR AND HUGH BUCHANAN, OF ROSARIO DE SANTA FE, ARGENTINA.

MEANS FOR THE MANUFACTURE, CENTRIFUGALLY, OF PIPES, COLUMNS, AND OTHER HOLLOW ARTICLES.

Application filed October 13, 1923. Serial No. 668,319½.

*To all whom it may concern:*

Be it known that we, DONALD MOIR and HUGH BUCHANAN, subjects of the King of Great Britain and Ireland, residing, respectively, at Rosario de Santa Fe, Argentine Republic, have invented Improvements in or Relating to the Means for the Manufacture, Centrifugally, of Pipes, Columns, and Other Hollow Articles, of which the following is a specification.

As is now well known various proposals have been made for subjecting plastic masses to centrifugal force for the purpose of manufacturing articles industrially. Whether the object has been the production of articles made in moulds, with or without reinforcement, or the lining of articles previously made in any suitable way, it has been customary to employ apparatus through the agency of which the mould or article has been caused to be driven at the requisite speed about a stationary axis. Carrying out the process with machinery in ways such as referred to does not readily allow of the wide range of applicability which is desirable but imposes limitations as to length and diameter of articles which can be manufactured or treated with convenience. In addition the initial cost, maintenance and operation of the machinery is relatively expensive.

According to the present invention these objections are overcome and other advantages derived by allowing or causing the mould or article to roll from one position to another during which time the requisite centrifugal action is set up.

Obviously the invention may be carried into effect in various ways but it is preferred to make use of a track along which the desired rolling action takes place by reason of gravity. In some cases a single downwardly inclined track may be employed terminating in a section which may be horizontal or partly horizontal and partly inclined in an upward direction, with in addition a further section whereon the mould or article can be brought to rest if so desired. In other cases a track may be employed which is curved throughout or a track comprising any combination of straight and curved sections.

When a mould or article is of cylindrical form externally and dimensioned so that it can be caused to pursue a proper rolling path it may roll directly upon the track but in all instances rolling members may be fitted to the mould or article.

In some instances the rolling members applied to the mould or article may project beyond the ends and take the form of trunnions of smaller diameter than the mould or article.

Where necessary any convenient means may be employed for ensuring proper travel of the moulds or articles along the tracks. Such means may comprise rack supports and toothed rolling members or a trailing carriage to act as a guide.

The invention is applicable to the manufacture of articles of uniform cross section, or which taper or vary in section throughout their length and whether they be treated but once centrifugally or are subjected to repeated centrifugal steps.

Thus the introduction of reinforcement in the production of a pipe for example might be made first and held in position prior to rolling or a pipe might have an initial layer of cement distributed centrifugally by rolling after which the reinforcement could be introduced and the cement for a subsequent layer to be distributed by rolling a second time.

The whole of the plastic mass may be introduced prior to travel of the mould or article, or it may be arranged to introduce same or some part thereof during the travel of the mould or article.

In the accompanying drawings, Fig. 1 is a side elevation and Fig. 2 a plan indicating semi-diagrammatically a runway such as may be used in carrying out the invention, Fig. 3 being a section, to a larger scale, on the line 3—3 Fig. 2. Fig. 4 is a plan corresponding to Fig. 3 showing one arrangement of means for lining a pipe for instance. Fig. 5 is an elevation of such means and Fig. 6 is a section on the line 6—6 of Fig. 4.

Referring to Fig. 1, an arrangement is shown by which rotary motion may be imparted to an article, such as a metal pipe, which it is desired to coat internally with concrete or the like. Here *a* is a suitably supported track, which in this case consists of two parallel rails upon which the pipe to which the lining is to be applied is made to roll. The first section $b$, $c$ of this track is inclined downwards, and is of such inclination and length that, when the pipe has rolled from $b$ to $c$, it will have acquired, due to the force exerted by gravity, the necessary velocity of rotation to project and consolidate around its inner surface, by the action of centrifugal force, material previously introduced for the purpose of forming the lining. A further section of track $c$, $d$, may be either horizontal or inclined at an angle which will just maintain the velocity of rotation acquired by the pipe when rolling down from $b$ to $c$, while an upwardly inclined section $d$, $e$ may be utilized either to bring the pipe to rest or to start it in the reverse directions should further rotation be desired.

The track $a$, at its origin, is provided with a working platform $f$, upon which may be installed suitable apparatus for preparing the mixture with which it is desired to line the pipe, and for introducing same into the interior previous to placing the pipe upon the inclined section $c$. A similar platform $g$ may be provided at the other extreme of the track if desired.

Although the track $a$ referred to is shown supported on a framed structure, this may, in many cases, be advantageously replaced by an earth embankment, or by taking advantage of special or natural contour features of the ground.

Fig. 4 illustrates the manner in which the semi-liquid mixture may be introduced into, and distributed uniformly along, the length of the pipe to be coated and, likewise, the manner in which the pipe may be supported and guided when rolling down the inclined track. Here $h$ is a tube, or hollow receptacle, provided with a longitudinal opening $i$ on one side, of a length equal to that of the pipe $j$, and is made to project some distance beyond each end of the pipe, the journals or bearing pins $k$ being provided at the extremities as shown. Each end of the pipe $j$ is closed by means of flanges $m$, which are bored at their centres to take the tube $h$, and to maintain this concentric with the pipe $j$. Engaging with the journals $k$ is a frame $n$, which carries two guide wheels $o$ running on the rails $a$ of the inclined track shown in Fig. 1. This frame $n$ may, for convenience, be simply hooked on to the journals in such a manner that it is easily detachable.

The operation of coating the interior of the pipe $j$ may then be effected as follows:—

The pipe is placed upon suitable supports on the working platform $f$, Fig. 1, and fitted with the end flanges $m$. The tube $h$ being withdrawn from the pipe is filled with a predetermined quantity of the mixture to be employed and afterwards introduced into the pipe in the position shown in Fig. 4.

The guide frame $n$ is next engaged with the journals $k$, the guide wheels $o$ being placed upon the rails $a$, after which the support is removed from under the pipe, thus allowing the projecting ends or journals $k$ of the tube $h$ to rest upon the rails. Sufficient forward movement is given so that the opening $i$ in the tube $h$ becomes lowermost and in this way the contents are permitted to fall out into the pipe. The whole is then pushed on to the inclined track $a$ when, by the action of gravity, rolling takes place down the incline and rotary motion is imparted to the pipe while the guide wheels $o$ prevent locking or derailment. The centrifugal forces thus generated in the mixture cause it to be projected and spread uniformly around the interior surface of the pipe and, in the case of lining with a concrete mixture, a separation of the excess water from the other constituents is effected due to the lower specific gravity of the former. This water, coming to the interior of the lining, is subsequently allowed to run off upon removal of the end flanges $m$, leaving a hard, dense coating of concrete firmly attached to the interior surface of the pipe.

In the manufacture of metal or concrete pipes, or of other hollow articles of a like nature, a similar procedure may be followed, the pipe referred to in the foregoing being substituted by a mould of the required form and dimensions.

As will be obvious the invention may be carried into effect in various other ways. For example if small diameter pipes are for example to be lined, the cement or other material may be introduced directly thereinto from one or each end in any suitable way, appropriate closures being applied to the ends of the pipes. It is thus apparent that means extending into the pipe such as has been illustrated are not essential.

What we claim is:—

1. Means for subjecting a plastic mass to centrifugal force in a hollow configuring member for purposes such as herein referred to, comprising an inclined track and journals projecting beyond the configuring member, which said journals are of smaller diameter than the hollow of the configuring member and engage the track to cause the configuring member to roll down the incline at a high velocity.

2. Means for subjecting a plastic mass to centrifugal force in a hollow configuring member for purposes such as herein referred to, comprising a traveller for said member having journals projecting beyond the ends of the configuring member and smaller in diameter than the hollow thereof and a gravitational track having a section down which the traveller is adapted to descend and a section adapted to bring the traveller to rest at a height above the lowest point in the path along which it travels, each section comprising rails upon which the projecting journals aforesaid are adapted to roll.

3. Means for subjecting a plastic mass to centrifugal force in a hollow configuring member for purposes such as herein referred to, comprising a two-rail track and a pair of journalled travellers secured to the configuring member so as to project therebeyond, said journals being of smaller diameter than the hollow of the configuring member and adapted to roll along the rails aforesaid.

4. Means for subjecting a plastic mass to centrifugal force in a hollow configuring member for purposes such as herein referred to, comprising a two-rail track and a member extending through the configuring member having journals projecting beyond the configuring member and smaller in diameter than the hollow of the latter, which journals are adapted to roll along the rails aforesaid.

5. Means for subjecting a plastic mass to centrifugal force in a configuring member for purposes such as herein referred to, comprising a two-rail track and a hollow member extending through the configuring member having journals projecting beyond the configuring member and adapted to roll along the rails aforesaid, such hollow member constituting a container for distributing the plastic mass to be centrifugally acted upon.

6. Means for subjecting a plastic mass to centrifugal force in a configuring member for purposes such as herein referred to, comprising a two-rail track, a pair of journalled travellers secured to the configuring member so as to project therebeyond and adapted to roll along the rails aforesaid and guide means adapted to ensure proper travel of the configuring member along the track.

7. Means for subjecting a plastic mass to centrifugal force in a configuring member for purposes such as herein referred to, comprising a two-rail track, a member extending through the configuring member having journals projecting beyond the configuring member and adapted to roll along the rails aforesaid and guide means adapted to ensure proper travel of the configuring member along the track.

8. Means for subjecting a plastic mass to centrifugal force in a configuring member for purposes such as herein referred to, comprising a two-rail track, a hollow member extending through the configuring member having journals projecting beyond the configuring member and adapted to roll along the rails aforesaid, such hollow member constituting a container for distributing the plastic mass to be centrifugally acted upon and guide means adapted to ensure proper travel of the configuring member along the track.

In testimony whereof we have signed our names to this specification.

HUGH BUCHANAN.
DONALD MOIR.